May 26, 1959 L. COXWORTH 2,888,064
CIRCUMFERENTIALLY TRAVELING TYPE TIRE MOUNTING DEVICE
Filed May 26, 1955 2 Sheets-Sheet 1
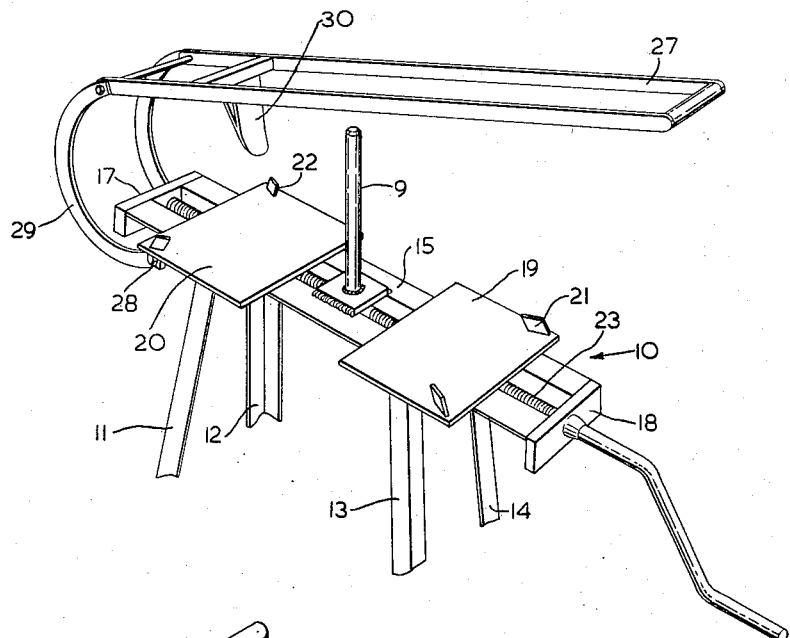
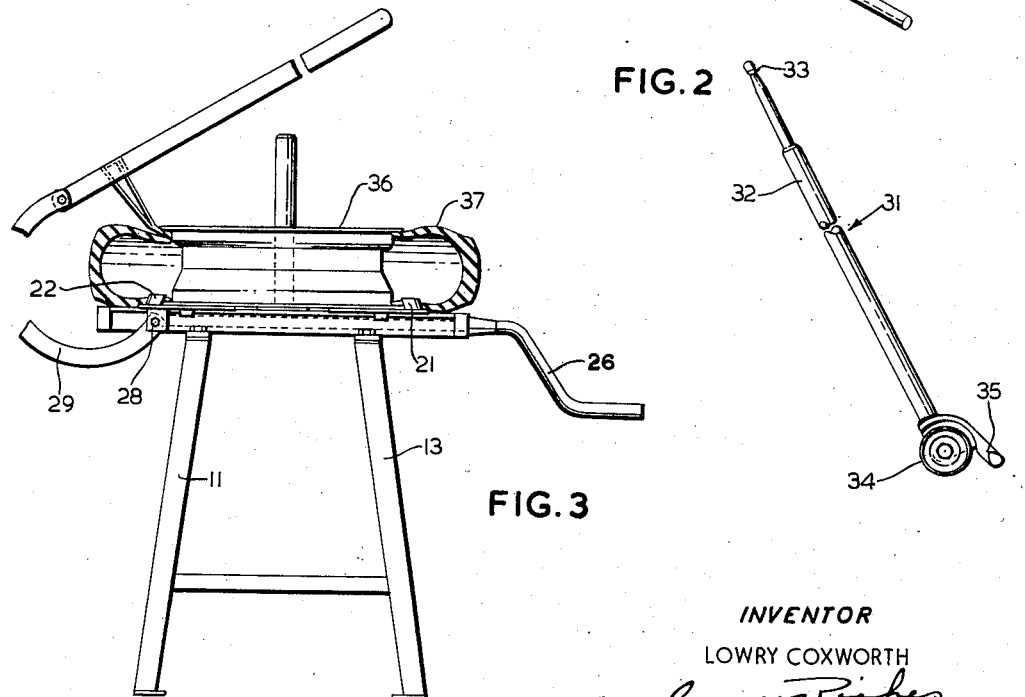
INVENTOR
LOWRY COXWORTH
BY: *Geo. T. Pikes*
ATTORNEY May 26, 1959    L. COXWORTH    2,888,064
CIRCUMFERENTIALLY TRAVELING TYPE TIRE MOUNTING DEVICE
Filed May 26, 1955    2 Sheets-Sheet 2
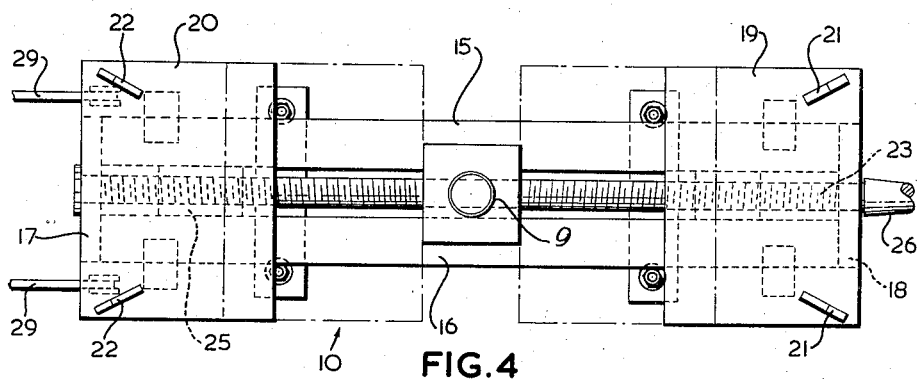
FIG.4
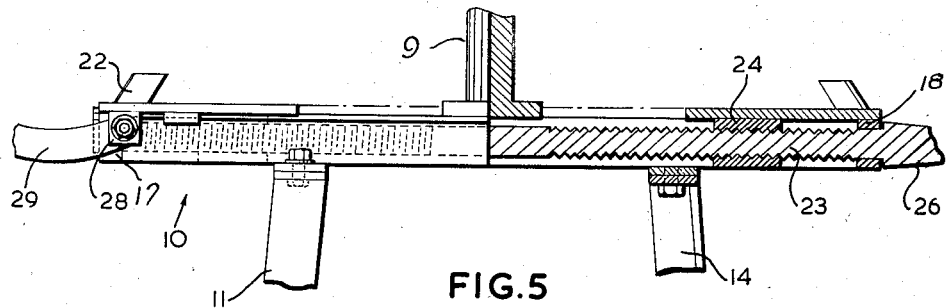
FIG.5
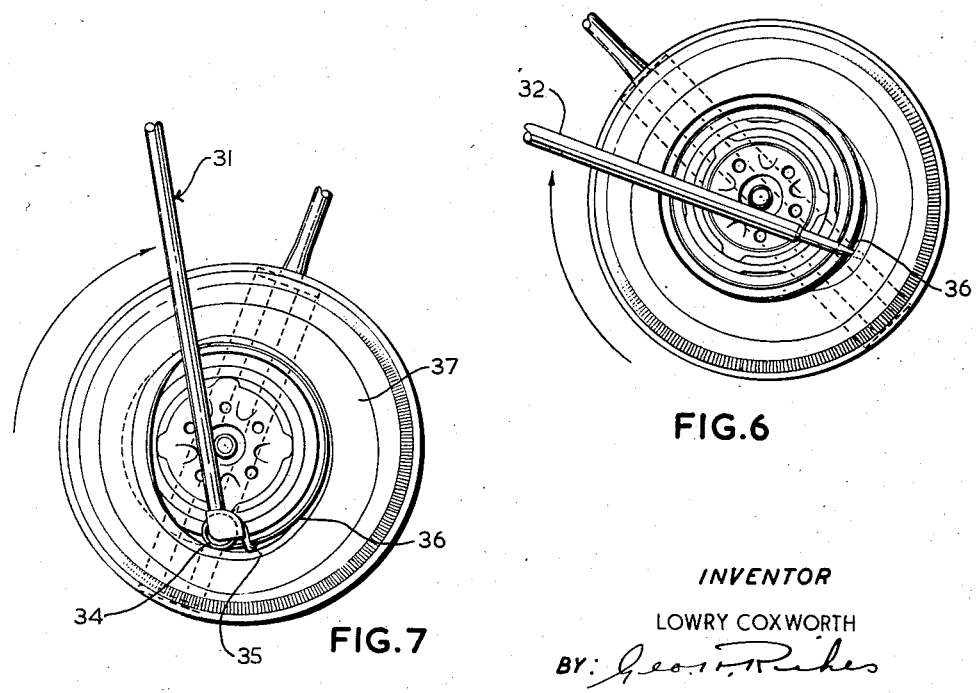
FIG.6
FIG.7
INVENTOR
LOWRY COXWORTH
BY: *George F. Riches*
ATTORNEY

United States Patent Office 2,888,064
Patented May 26, 1959

2,888,064

CIRCUMFERENTIALLY TRAVELING TYPE TIRE MOUNTING DEVICE

Lowry Coxworth, Winnipeg, Manitoba, Canada, assignor to Walter H. Bailey, Toronto, Ontario, Canada Application May 26, 1955, Serial No. 511,312

2 Claims. (Cl. 157—1.24)

This invention relates to a tire changer and in particular to an apparatus for removing and replacing a tire on a wheel rim.

An object of the invention is to provide a simple and sturdy machine designed to handle all drop center tires and lifeguard tubes without pounding, beating or marring the walls of tires.

The apparatus for removing and replacing a tire on a wheel rim having a center opening therein comprises a frame, a center post projecting vertically from said frame, a pair of clamping plates on opposite sides of said post and having rim engaging lugs mounted thereon, means for moving said clamping plates into clamping engagement with the wheel rim, a lever fulcrumed to said frame adjacent the outer end thereof and disposed above the tire when it is supported on the frame, a bead breaking foot carried by said lever, and a tire removing and replacing tool having at one end a bead receiving notch and at the other end a roller and a rim engaging hook.

For an understanding of the invention and the manner in which the same is constructed and operated reference is to be had to the following description and the accompanying drawings in which:

Figure 1 is a perspective view of the tire changer of the present invention;

Figure 2 is a view of the tire tool;

Figure 3 is a side elevation of the tire changer showing a tire in the first stages of being removed from the rim;

Figure 4 is a plan view of the tire changer shown in Figure 3;

Figure 5 is a longitudinal section of the device shown in Figure 4;

Figure 6 is a perspective view showing the tire being removed and

Figure 7 shows the tire being replaced on the wheel rim.

The apparatus shown in the drawings comprises a substantially elongated rectangular frame 10 which is supported on legs 11, 12, 13 and 14, the rectangular frame comprising side frame members 15, 16 and the end frame members 17, 18. Mounted centrally on the side frame members 15, 16 is a center post 9 and mounted on the frame members 15, 16, on each side of the post are clamping plates 19, 20, the clamping plate 19 being provided with a pair of spaced apart rim engaging lugs 21 and the plate 20 being provided with a pair of spaced apart rim engaging lugs 22. Mounted longitudinally in the frame 10 between the side members 15, 16 is a clamping screw 23 which enters through the clamp screw brackets 24, 25 mounted on the underside of the clamping plates 19, 20 respectively. The clamping screw 23 is extended beyond the frame member and terminates in a crank 26 by means of which the operator turns the screw to bring the clamping plates into clamping engagement with the tire rim.

Mounted on the end of the frame opposite to the end which carries the crank 26, is a bead breaking lever 27 pivotally connected to the frame at 28 which serves as the fulcrum of the lever, the portion of the lever 27 adjacent the fulcrum 28 being arcuately curved through approximately 180° as indicated at 29 so that the bead breaking lever 27 will be directly above the frame 10 when in its operative position. The bead breaking lever 27 carries a bead breaking foot 30 which is positioned so that in the operative position, it will be substantially directly above the rim of the tire.

The tire removing and replacing tool is indicated by the numeral 31 and comprises, in the present construction a tubular shaft 32, of sufficient length to operate as a power lever and having one end reduced in diameter to form a bead engaging groove 33 and at the other end a bead engaging roller 34 and a rim engaging hook 35 extending outwardly from said end at a small angle relative to the longitudinal axis of the lever and tangentially to one side of said roller. When the shaft 32 is applied against the post for remounting the tire the rim engaging hook is at least as close to the axis of the post as the bead engaging portion of the roller measured radially from the center post whereby the said hook follows said roller in traversing the tire bead and presses against the bead of the tire whereby the tire is remounted on the wheel rim. The angle referred to is an angle of between 20° and 35° as illustrated in the drawings.

The wheel rim is indicated by the numeral 36 and the tire by the numeral 37.

The operation of removing and replacing the tire is shown in Figures 3, 4 and 5. The first step in removing the tire is to place the rim on the frame with the outside of the tire down and with the level 27 apply pressure so that foot 30 presses the tire downwardly until the bead is broken. The wheel is then turned over and clamped to the frame by turning the screw 26 to tighten the clamping plates 19, 20 against the inside of the wheel rim. The lever 27 is again operated until the second bead is broken. If the tire is extremely tight to the rim, as is sometimes the case with safety rims, it may be necessary to break the bead in several places around the rim.

The next step is to remove the tire and this is accomplished by inserting the tire removal tool so that the bead engages in the bead engaging groove 33. Using the center post 9 as a fulcrum for the shaft 32, pull the tool 31 clockwise; one-third turn will remove the top bead from the rim. The tire tube can now be removed. The opposite bead may be removed by using the same procedure. In taking off lifeguard tubes, use soap and water to lubricate the rim, then using the same tool and the same procedure remove the first bead and then with the same tool remove the tube from the casing.

To replace the tire on the wheel rim, the following procedure is followed. The first step is to replace the tube in the casing and then place the casing on the wheel rim which has been previously mounted on the frame and clamped in position by the clamping plates 19, 20, so that the valve is in the right position. With the tool against the center post 9, hook the member 35 over the rim and place the roller against the tire bead. By pulling clockwise against the center post, the roller 34 will roll the bottom bead onto the wheel rim. In the case of lifeguard tubes, the tube will be rolled into the casing in the same way as the top bead. The final step is to roll the top bead on to the rim in the same manner as the bottom bead has been rolled onto the wheel rim as previously described.

What I claim as new and desire to protect by United States Letters Patent is:

1. In a device for removing and replacing an automobile tire on a wheel rim having a center opening therein, a frame, a center post projecting vertically from said frame, a pair of clamping plates on opposite sides of said post and having rim engaging lugs mounted thereon, at least one of said plates being movable into clamping engagement with the wheel rim, and means for moving said clamping plate, a tire remounting tool comprising a bar of sufficient length to operate as a power lever when engaged against said post, a tire bead engaging roller mounted on one end of the lever and a wheel rim engaging hook extending outwardly from said end at a small angle relative to the longitudinal axis of the lever and tangentially to one side of said roller, the rim engaging hook being at least as close to the axis of the center post as the bead engaging portion of the roller when said bar is engaged against said center post whereby said hook follows said roller in traversing the tire bead and presses against the bead of the tire whereby the tire is replaced on the wheel rim.

2. A tire remounting tool as defined in claim 1 in which the hook is disposed at an angle of approximately 25° to the longitudinal axis of the lever.

References Cited in the file of this patent
UNITED STATES PATENTS

| | | |
|---|---|---|
| 834,908 | Hussey | Nov. 6, 1906 |
| 1,307,131 | Kimbel | June 17, 1919 |
| 2,471,642 | Moltz | May 31, 1949 |
| 2,504,760 | Tillotson | Apr. 18, 1950 |
| 2,556,024 | Bourdon et al. | June 5, 1951 |
| 2,569,788 | Weaver | Oct. 2, 1951 |
| 2,569,789 | Weaver | Oct. 2, 1951 |
| 2,695,659 | Athmann | Nov. 30, 1954 |
| 2,708,954 | Schultz | May 24, 1955 |